(12) United States Patent
Bauchot et al.

(10) Patent No.: US 7,924,807 B2
(45) Date of Patent: Apr. 12, 2011

(54) SYSTEM AND METHOD FOR SYNCHRONIZING COMMUNICATING ENTITIES IN A DECENTRALIZED NETWORK

(75) Inventors: Frederic Bauchot, Saint-Jeannet (FR); Jean-Yves Clement, Saint-Jeannet (FR); Gerard Marmigère, Drap (FR); Joaquin Picon, Saint-Laurent-Du-Var (FR)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 12/328,925

(22) Filed: Dec. 5, 2008

(65) Prior Publication Data

US 2010/0135331 A1 Jun. 3, 2010

(30) Foreign Application Priority Data

Nov. 28, 2008 (EP) .................................... 08305866

(51) Int. Cl.
*H04J 3/06* (2006.01)
*H04J 3/26* (2006.01)
*H04L 12/28* (2006.01)

(52) U.S. Cl. ........ 370/350; 370/390; 370/432; 370/503; 370/507

(58) Field of Classification Search ........................ None
See application file for complete search history.

(56) References Cited

U.S. PATENT DOCUMENTS

| 5,729,680 | A | 3/1998 | Belanger et al. |
| 7,266,104 | B2 | 9/2007 | Belcea |
| 7,388,886 | B2 * | 6/2008 | Perkins et al. ................ 370/507 |
| 2009/0006882 | A1 * | 1/2009 | Manapragada et al. ...... 713/600 |

* cited by examiner

*Primary Examiner* — Seema S Rao
*Assistant Examiner* — Christine Duong
(74) *Attorney, Agent, or Firm* — Schmeiser, Olsen & Watts; John Pivnichny

(57) ABSTRACT

A method for synchronizing communicating entities in a decentralized network. The method begins with a recipient entity receiving data comprising a first timestamp and a first distance. The first timestamp being the time the first data was broadcast; the first distance being a distance from the sender's synchronization time. Next the recipient entity receives data comprising a second timestamp and a second distance. The second timestamp being the time the second data was broadcast; the second distance being a distance from the sender's synchronization time. Based on the first and second timestamps and distances, the recipient entity calculates a new synchronization time. Next, the recipient entity broadcasts to at least one entity in the decentralized network data comprising a third timestamp and a third distance. The third timestamp being the time the third data was broadcast; the third distance being a distance from the recipient entity's synchronization time.

20 Claims, 4 Drawing Sheets

SYSTEM AND METHOD FOR SYNCHRONIZING COMMUNICATING ENTITIES IN A DECENTRALIZED NETWORK

BACKGROUND OF THE INVENTION

The present invention relates generally to synchronizing network entities and more particularly to synchronizing entities in a decentralized wireless or wired network without utilizing a master/slave configuration.

Decentralized and/or 'ad hoc' networks require synchronization between network entities in order to facilitate data transfer. Conventional decentralized wireless or wired networks utilize a master/slave relationship between entities. Traditionally all slave entities track the master entity's clock cycles in order to know when it is appropriate to send and receive data.

The master/slave relationship limits the number of entities which can communicate in a given network. Furthermore, the conventional master/slave relationship prohibits communication directly between two or slave entities for all communication is routed through the master entity.

SUMMARY OF THE INVENTION

The present invention provides a method for synchronizing communicating entities in a decentralized network, said method comprising:

receiving first data from a first communicating entity residing in said decentralized network, said first data comprising a first timestamp and a first distance, said first timestamp being a time when said first data was broadcast by said first communicating entity, said first distance being a measurement of time between said first timestamp and a first synchronization time corresponding to said first communicating entity, said receiving being performed by a recipient entity residing in said decentralized network;

receiving second data from a second communicating entity residing in said decentralized network, said second data comprising a second timestamp and a second distance, said second timestamp being a time when said second data was broadcast by said second communicating entity, said second distance being a measurement of time between said second timestamp and a second synchronization time corresponding to said second communicating entity, said first distance not being equal to said second distance, said receiving being performed by said recipient entity, said first communicating entity and said second communicating entity being a same communicating entity or different communicating entities;

calculating a third synchronization time, said third synchronization time being a function of said first timestamp and said second timestamp and said first distance and said second distance, said calculating being performed by said recipient entity; and broadcasting third data to at least one communicating entity residing in said decentralized network, said third data comprising a third timestamp and a third distance, said third timestamp being a time when said third data was broadcast by said recipient entity, said third distance being a measurement of time between said third timestamp and said third synchronization time, said broadcasting being performed by said recipient entity.

DETAILED DESCRIPTION OF THE DRAWINGS

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
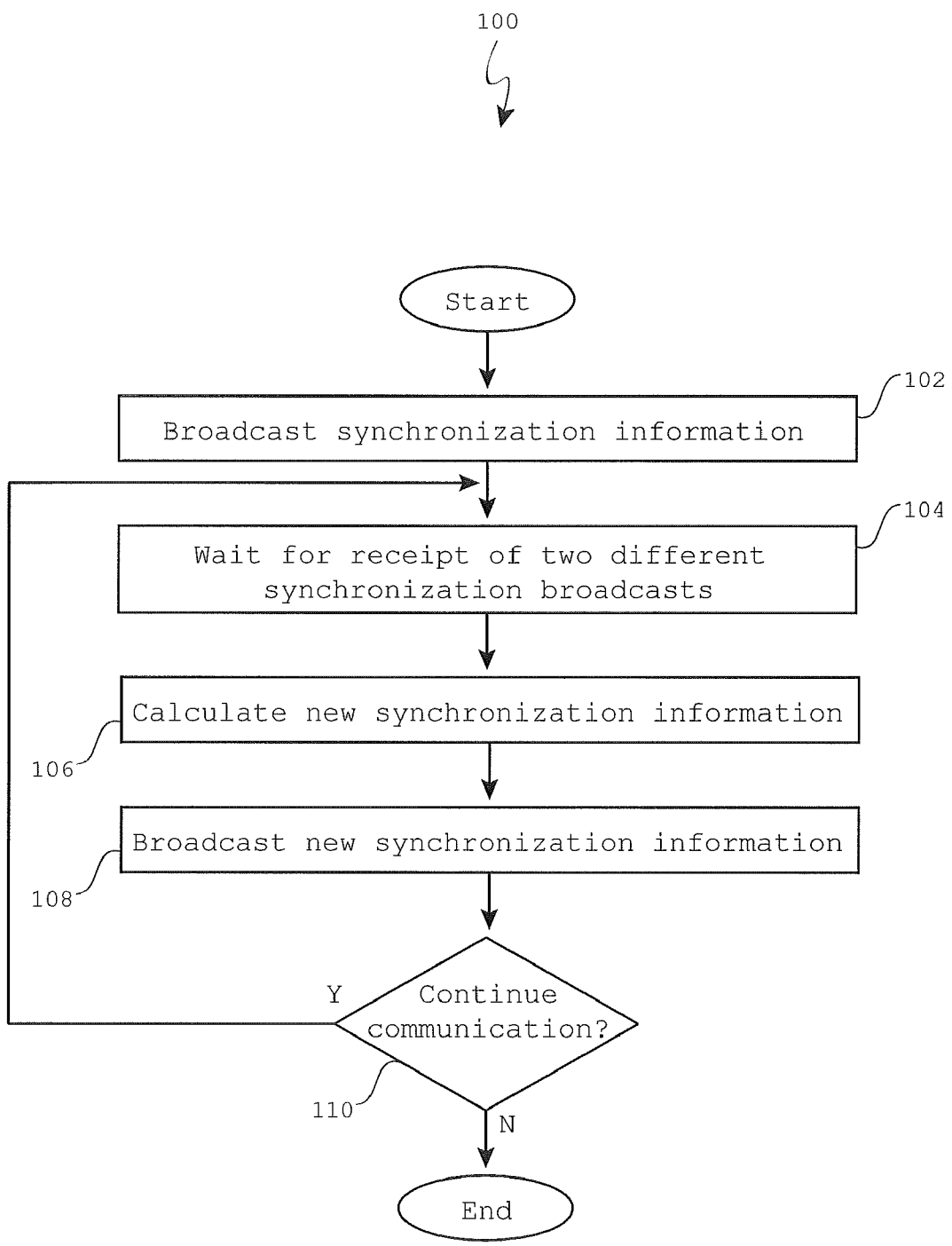
FIG. 1 illustrates a method for synchronizing communicating entities in a decentralized network, in accordance with embodiments of the present invention.

FIG. 1 illustrates a method 100 for synchronizing communicating entities in a decentralized network, in accordance with embodiments of the present invention.

The method 100 begins with step 102 which comprises broadcasting synchronization information. Each communicating entity announces its arrival to the decentralized network by means of broadcasting its synchronization information. The synchronization information comprises a distance (measured in time) between the current time and a time in which the communicating entity synchronizes.

In one embodiment of the present invention, the synchronization information is broadcast by the communicating entity in concert with data. In an alternative embodiment of the present invention, the synchronization information is broadcast in concert with control data as defined by the transmission protocol to ensure a minimum level of data is exchanged between communicating entities. For a more detailed explanation of the synchronization information see FIG. 3, infra.

After completion of step 102, the method 100 continues with step 104 which comprises waiting for the receipt of two different synchronization broadcasts. When a recipient communicating entity receives synchronization broadcasts from a sender entity, the recipient entity stores the sender's synchronization information in memory. In one embodiment of the present invention, each communicating entity only stores the two most recently received synchronization broadcasts.

The recipient entity compares the two most recently received synchronization broadcasts; specifically comparing the synchronization time of each broadcast. The synchronization time is calculated by subtracting the synchronization distance (SD) from the broadcast time (BT). If the two synchronization times are different, step 104 completes and the method 100 continues with step 106 which comprises calculating new synchronization information.

However, if the synchronization times residing in the two most recently received synchronization broadcasts are identical, step 104 purges the oldest synchronization broadcast information and continues to wait for subsequent synchronization information to compare.

Step 106 comprises calculating new synchronization information in response to receiving two synchronization broadcasts having different synchronization times. As noted supra, the synchronization information comprises the current time of the broadcast and a distance, measured in time, from the broadcasting entity's synchronization time.

In one embodiment of the present invention, step 106 calculates the recipient entity's new synchronization information according to the function:

$$\text{New Sync} = BT_2 - \frac{SD_2 + (BT_2 - BT_1) + SD_1}{2}$$

$BT_1$ is the broadcast time for the first received synchronization information; $BT_2$ is the broadcast time for the second received synchronization information; $SD_1$ is the synchronization distance for the first received synchronization information; and $SD_2$ is the synchronization distance for the second received synchronization information.

In an alternative embodiment of the present invention, step 106 calculates the recipient entity's new synchronization information according to the function:

$$\text{New Sync} = BT_1 - \frac{SD_1 + (SD_2 - (BT_2 - BT_1))}{2}$$

After completion of step 106, the method 100 continues with step 108 which comprises broadcasting the new synchronization information. The recipient entity having already calculated its new synchronization time broadcasts the current time (BT) and the distance (SD), measured in time, from the current time (BT) and the synchronization time. In one embodiment of the present invention, after broadcasting the new synchronization information, step 108 is complete and the method 100 ends.

In an alternative embodiment of the present invention, after broadcasting the new synchronization information, step 108 ends and the method 100 continues with step 110 which comprises determining whether the recipient entity is continuing to communicate in the decentralized network.

If the recipient entity is continuing to communicate via the decentralized network (i.e. still in the process of sending and/or receiving data), then 110 returns a response of 'yes' and the method 100 returns to step 104 and wait for two different synchronization broadcasts.

However, if the recipient entity is no longer communicating in the decentralized network (i.e. transmission has stopped, other entities are not present, etc.) then step 110 returns a response of 'no' and the method 100 ends.

Figure 2:
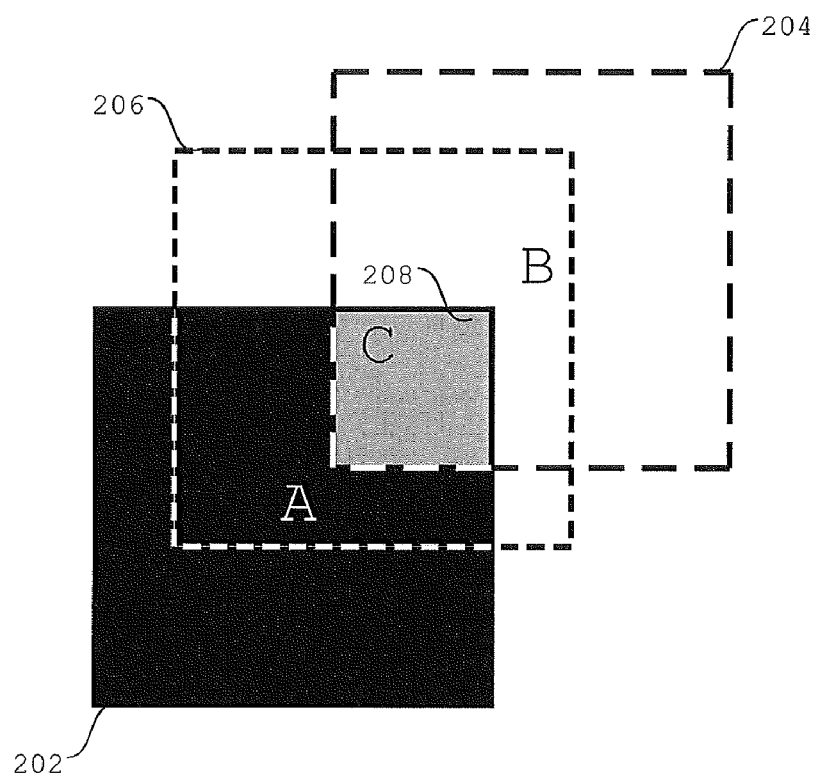
FIG. 2 illustrates a scenario in which a method for synchronizing communicating entities in a decentralized network may be implemented, in accordance with embodiments of the present invention.

FIG. 2 illustrates a scenario 200 in which a method for synchronizing communicating entities in a decentralized network may be implemented, in accordance with embodiments of the present invention.

The scenario 200 comprises three entities: A, B, and C. The area in which entity A is able to broadcast information is denoted by the square 202. The area in which entity B is able to broadcast information is denoted by the square 204. The area in which entity C is able to broadcast information is denoted by the square 206.

The scenario 200 illustrates how communicating entities have limited broadcast capabilities for entities A and B are not aware of each other's existence. Entity A does not reside within B's broadcast square 204, therefore entity A does not receive information from entity B. Similarly, entity B does not reside within A's broadcast square 202, therefore entity B does not receive information from entity A.

Entity C resides within the overlap square 208 which receives information broadcasted from both entities A and B. Therefore, entity C can receive information from both entities A and B. Likewise, entities A and B both reside within C's broadcast square 206, thus A and B can receive information from entity C.

If entity C were absent from the scenario 200, the method 100 could not be implemented for entities A and B would never receive synchronization information from each other (see FIG. 1, supra). Consequently, in order to implement the method 100 there must be at least two entities which can send and receive information from each other (i.e. A and C, or B and C).

Figure 3:
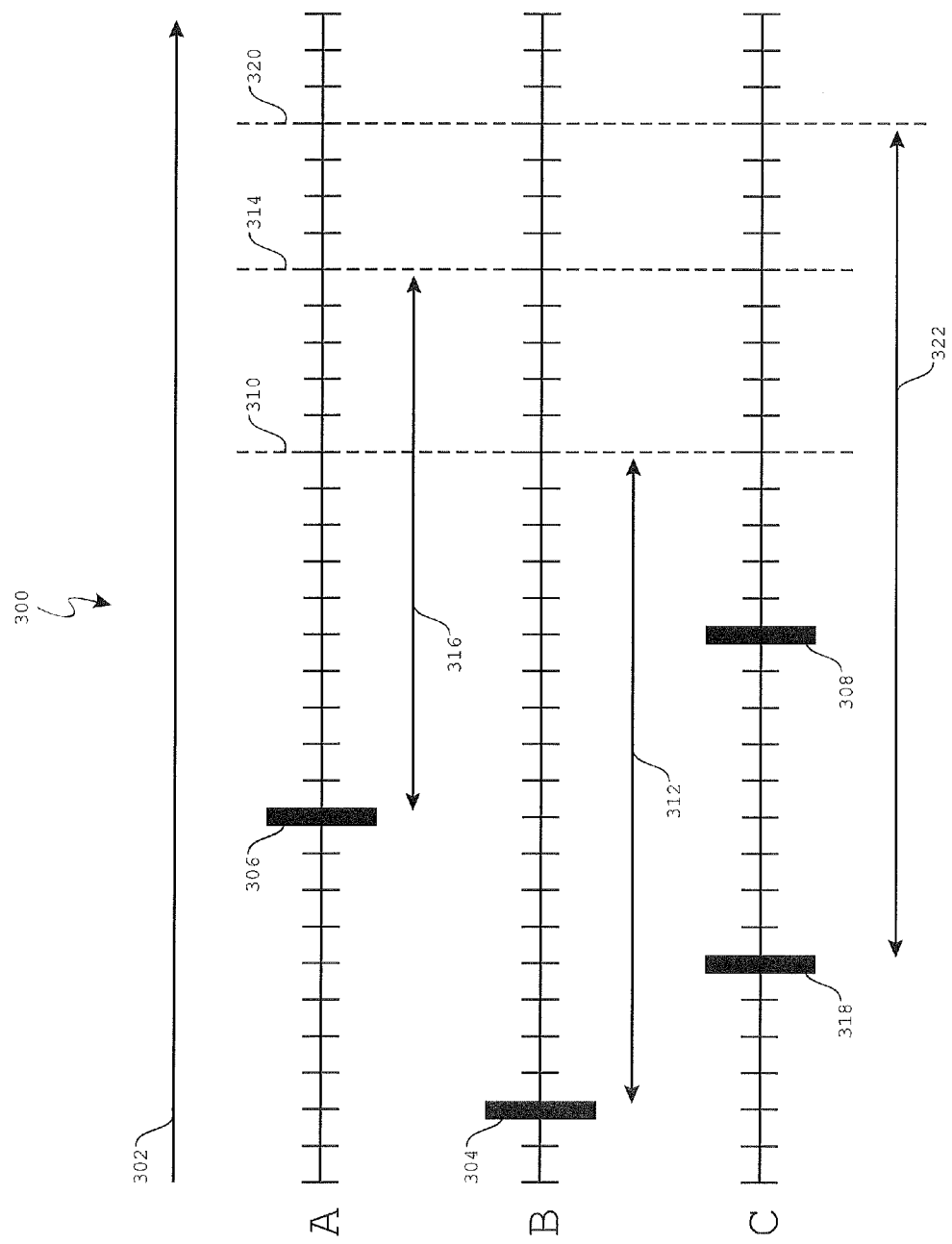
FIG. 3 illustrates the result of implementing a method for synchronizing communicating entities in a decentralized network, in accordance with embodiments of the present invention.

FIG. 3 illustrates the result 300 of implementing a method for synchronizing communicating entities in a decentralized network, in accordance with embodiments of the present invention.

The result 300 comprises line 302 which represents the direction in which time travels. Units of time are not relevant to the understanding of the result 300, therefore time will be described as follows: time 1, time 2, . . . , time 30.

At time 3 there is only one entity in the decentralized network, entity B. B broadcasts its synchronization information 304 at time 3. However, note that since B is the only entity in the decentralized network at time 3, no other entity receives B's broadcast information.

At time 11 entity A enters the decentralized network and broadcasts its synchronization information 306. However, since entities A and B are too distant from each other (see FIG. 2, supra), no entity receives A's synchronization information.

At time 16 entity C enters the decentralized network and broadcasts its synchronization information 308. Because entity C resides in a location where entity A and entity B's signals overlap (square 208, see FIG. 2, supra), when C broadcasts its synchronization information 308 both A and B receive said information. In response to receiving C's synchronization information 308, entities A and B record C's synchronization information pursuant to step 104 (see FIG. 1, supra).

At time 21 entity B broadcasts information 310, the information 310 comprising the current time (time 21) and the distance 312 from B's synchronization time (time 21−time 3=distance of 18). In response to receiving B's broadcasted information 310, entity C records B's synchronization information pursuant to step 104 (see FIG. 1, supra).

At time 26 entity A broadcasts information 314, the information 314 comprising the current time (time 26) and the distance 316 from A's synchronization time (time 26−time 11=distance of 15). In response to receiving A's broadcasted information 314, entity C records A's synchronization information pursuant to step 104 (see FIG. 1, supra).

Since entity C received two different synchronization broadcasts (310 and 314), C calculates its new synchronization information pursuant to step 106 (see FIG. 1, supra).

In one embodiment of the present invention, entity C calculates its new synchronization time as follows:

$$\text{New Sync} = BT_2 - \frac{SD_2 + (BT_2 - BT_1) + SD_1}{2}$$

$$= 26 - \frac{15 + (26 - 21) + 18}{2}$$

$$= 26 - \frac{38}{2} = 26 - 19 = 7$$

In an alternative embodiment of the preset invention, entity C calculates its new synchronization time as follows:

$$\text{New Sync} = BT_1 - \frac{SD_1 + (SD_2 - (BT_2 - BT_1))}{2}$$
$$= 21 - \frac{18 + (15 - (26 - 21))}{2}$$
$$= 21 - \frac{28}{2} = 21 - 14 = 7$$

As a result of using either embodiment of the present invention, entity C's new synchronization 318 time is time 7.

Finally at time 30 entity C broadcasts information 320, the information 320 comprising the current time (time 30) and the distance 322 from C's synchronization time (time 30−time 7=distance of 23). In response to receiving C's broadcasted information 320, entities A and B record C's synchronization information pursuant to step 104 (see FIG. 1, supra).

Since entities A and B both received two different synchronization broadcasts (308 and 318), both entities would respectively calculate new synchronization times pursuant to step 106 (see FIG. 1, supra). The method 100 continues until all entities are synchronizing at the same time.

Figure 4:
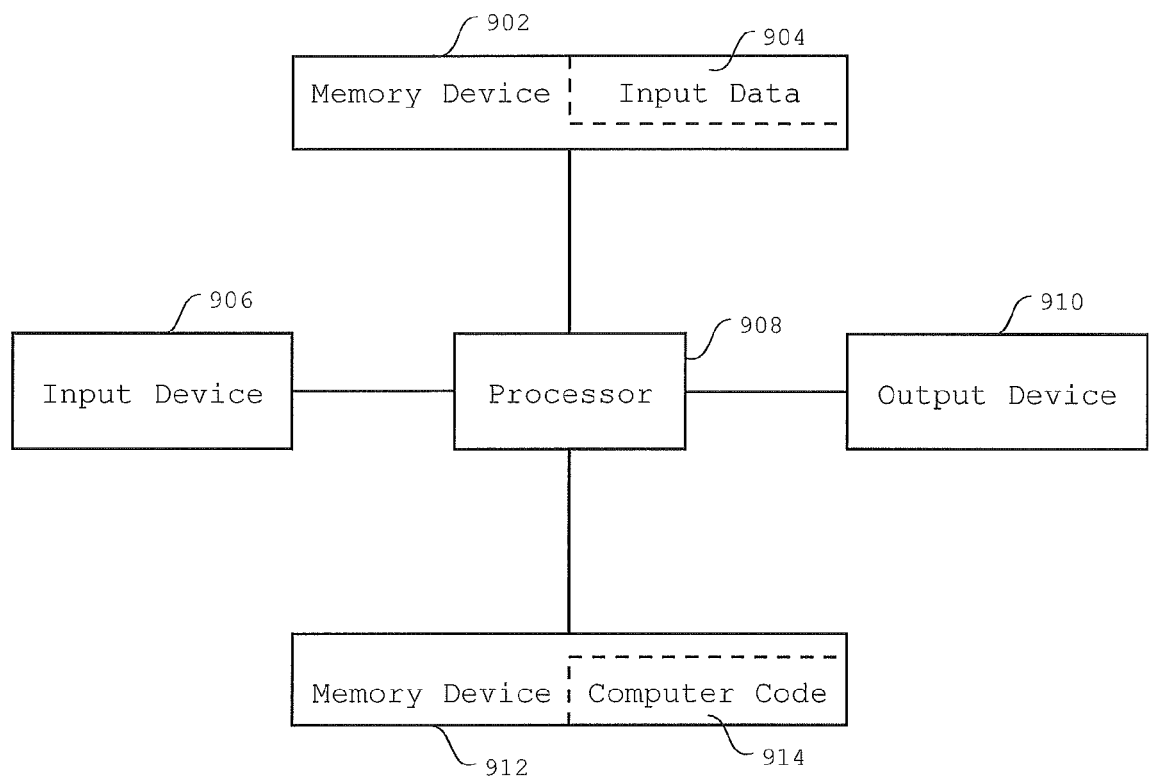
FIG. 4 illustrates a computer system which may facilitate a method for synchronizing communicating entities in a decentralized network, in accordance with embodiments of the present invention.

FIG. 4 illustrates a computer system 900 which may facilitate a method for synchronizing communicating entities in a decentralized network, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for synchronizing communicating entities in a decentralized network according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for synchronizing communicating entities in a decentralized network. Thus, the present invention discloses a process for supporting computer infrastructure, comprising integrating, hosting, maintaining and deploying computer-readable code into a computing system (e.g., computing system 900), wherein the code in combination with the computing system is capable of performing a method for synchronizing communicating entities in a decentralized network.

In another embodiment, the invention provides a business method that performs the process steps of the invention on a subscription, advertising and/or fee basis. That is, a service provider, such as a Solution Integrator, can offer to create, maintain, support, etc. a process for synchronizing communicating entities in a decentralized network. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for synchronizing communicating entities in a decentralized network, said method comprising:

receiving first data from a first communicating entity residing in said decentralized network, said first data comprising a first timestamp and a first distance, said first timestamp being a time when said first data was broadcast by said first communicating entity, said first distance being a measurement of time between said first timestamp and a first synchronization time at which said first communicating entity entered said decentralized network, said receiving being performed by a recipient entity residing in said decentralized network;

receiving second data from a second communicating entity residing in said decentralized network, said second data comprising a second timestamp and a second distance, said second timestamp being a time when said second data was broadcast by said second communicating entity, said second distance being a measurement of time between said second timestamp and a second synchronization time at which said second communicating entity entered said decentralized network, said first distance not being equal to said second distance, said receiving being performed by said recipient entity, said first communicating entity and said second communicating entity being a same communicating entity or different communicating entities;

calculating a third synchronization time, said third synchronization time being a function of said first timestamp and said second timestamp and said first distance and said second distance, said calculating being performed by said recipient entity; and broadcasting third data to at least one communicating entity residing in said decentralized network, said third data comprising a third timestamp and a third distance, said third timestamp being a time when said third data was broadcast by said recipient entity, said third distance being a measurement of time between said third timestamp and said third synchronization time, said broadcasting being performed by said recipient entity.

2. The method of claim 1, said calculating said third synchronization time comprising:

calculating said third synchronization time according to third synchronization time=$BT_2-(SD_2+(BT_2-BT_1)+SD_1)/2$, wherein $BT_1$ is said first timestamp, wherein $BT_2$ is said second timestamp, wherein $SD_1$ is said first distance, and wherein $SD_2$ is said second distance.

3. The method of claim 1, said calculating said third synchronization time comprising:

calculating said third synchronization time according to third synchronization time=$BT_1-(SD_1+(SD_2-(BT_2-BT_1)))/2$, wherein $BT_1$ is said first timestamp, wherein $BT_2$ is said second timestamp, wherein $SD_1$ is said first distance, and wherein $SD_2$ is said second distance.

4. A computer program product, comprising a computer readable physically tangible storage device having a computer-readable program code stored therein, said computer-readable program code containing instructions that when executed by a processor of a computer system implement a method for synchronizing communicating entities in a decentralized network, said method comprising:

receiving first data from a first communicating entity residing in said decentralized network, said first data comprising a first timestamp and a first distance, said first timestamp being a time when said first data was broadcast by said first communicating entity, said first distance being a measurement of time between said first timestamp and a first synchronization time at which said first communicating entity entered said decentralized network, said receiving being performed by a recipient entity residing in said decentralized network;

receiving second data from a second communicating entity residing in said decentralized network, said second data comprising a second timestamp and a second distance, said second timestamp being a time when said second data was broadcast by said second communicating entity, said second distance being a measurement of time between said second timestamp and a second synchronization time at which said second communicating entity entered said decentralized network, said first distance not being equal to said second distance, said receiving being performed by said recipient entity, said first communicating entity and said second communicating entity being a same communicating entity or different communicating entities;

calculating a third synchronization time, said third synchronization time being a function of said first timestamp and said second timestamp and said first distance and said second distance, said calculating being performed by said recipient entity; and broadcasting third data to at least one communicating entity residing in said decentralized network, said third data comprising a third timestamp and a third distance, said third timestamp being a time when said third data was broadcast by said recipient entity, said third distance being a measurement of time between said third timestamp and said third synchronization time, said broadcasting being performed by said recipient entity.

5. The computer program product of claim 4, said calculating said third synchronization time comprising:

calculating said third synchronization time according to third synchronization time=$BT_2-(SD_2+(BT_2-BT_1)+SD_1)/2$, wherein $BT_1$ is said first timestamp, wherein $BT_2$ is said second timestamp, wherein $SD_1$ is said first distance, and wherein $SD_2$ is said second distance.

6. The computer program product of claim 4, said calculating said third synchronization time comprising:

calculating said third synchronization time according to third synchronization time=$BT_1-(SD_1+(SD_2-(BT_2-BT_1)))/2$, wherein $BT_1$ is said first timestamp, wherein $BT_2$ is said second timestamp, wherein $SD_1$ is said first distance, and wherein $SD_2$ is said second distance.

7. A computing system comprising a processor coupled to a computer-readable memory unit, said memory unit comprising a software application, said software application comprising instruction that when executed by said processor, implement a method for synchronizing communicating entities in a decentralized network, said method comprising:

receiving first data from a first communicating entity residing in said decentralized network, said first data comprising a first timestamp and a first distance, said first timestamp being a time when said first data was broadcast by said first communicating entity, said first distance being a measurement of time between said first timestamp and a first synchronization time at which said first communicating entity entered said decentralized network, said receiving being performed by a recipient entity residing in said decentralized network;

receiving second data from a second communicating entity residing in said decentralized network, said second data comprising a second timestamp and a second distance, said second timestamp being a time when said second data was broadcast by said second communicating entity, said second distance being a measurement of time between said second timestamp and a second synchronization time at which said second communicating entity entered said decentralized network, said first distance not being equal to said second distance, said receiving being performed by said recipient entity, said first communicating entity and said second communicating entity being a same communicating entity or different communicating entities;

calculating a third synchronization time, said third synchronization time being a function of said first timestamp and said second timestamp and said first distance and said second distance, said calculating being performed by said recipient entity; and broadcasting third data to at least one communicating entity residing in said decentralized network, said third data comprising a third timestamp and a third distance, said third timestamp being a time when said third data was broadcast by said recipient entity, said third distance being a measurement of time between said third timestamp and said third synchronization time, said broadcasting being performed by said recipient entity.

8. The computing system of claim 7, said calculating said third synchronization time comprising:

calculating said third synchronization time according to third synchronization time=$BT_2-(SD_2+(BT_2-BT_1)+SD_1)/2$, wherein $BT_1$ is said first timestamp, wherein $BT_2$ is said second timestamp, wherein $SD_1$ is said first distance, and wherein $SD_2$ is said second distance.

9. The computing system of claim 7, said calculating said third synchronization time comprising:
calculating said third synchronization time according to
third synchronization time=$BT_1-(SD_1+(SD_2-(BT_2-BT_1)))/2$, wherein $BT_1$ is said first timestamp, wherein $BT_2$ is said second timestamp, wherein $SD_1$ is said first distance, and wherein $SD_2$ is said second distance.

10. A process for supporting computer infrastructure, said process comprising providing at least one support service for at least one of creating, integrating, hosting, maintaining, and deploying computer-readable code in a computing system, wherein said code in combination with the computing system is capable of implementing a method for synchronizing communicating entities in a decentralized network, said method comprising:
receiving first data from a first communicating entity residing in said decentralized network, said first data comprising a first timestamp and a first distance, said first timestamp being a time when said first data was broadcast by said first communicating entity, said first distance being a measurement of time between said first timestamp and a first synchronization time at which said first communicating entity entered said decentralized network, said receiving being performed by a recipient entity residing in said decentralized network;
receiving second data from a second communicating entity residing in said decentralized network, said second data comprising a second timestamp and a second distance, said second timestamp being a time when said second data was broadcast by said second communicating entity, said second distance being a measurement of time between said second timestamp and a second synchronization time at which said second communicating entity entered said decentralized network, said first distance not being equal to said second distance, said receiving being performed by said recipient entity, said first communicating entity and said second communicating entity being a same communicating entity or different communicating entities;
calculating a third synchronization time, said third synchronization time being a function of said first timestamp and said second timestamp and said first distance and said second distance, said calculating being performed by said recipient entity; and
broadcasting third data to at least one communicating entity residing in said decentralized network, said third data comprising a third timestamp and a third distance, said third timestamp being a time when said third data was broadcast by said recipient entity, said third distance being a measurement of time between said third timestamp and said third synchronization time, said broadcasting being performed by said recipient entity.

11. The process for supporting computer infrastructure of claim 10, said calculating said third synchronization time comprising:
calculating said third synchronization time according to
third synchronization time=$BT_2-(SD_2+(BT_2-BT_1)+SD_1)/2$, wherein $BT_1$ is said first timestamp, wherein $BT_2$ is said second timestamp, wherein $SD_1$ is said first distance, and wherein $SD_2$ is said second distance.

12. The process for supporting computer infrastructure of claim 10, said calculating said third synchronization time comprising:
calculating said third synchronization time according to
third synchronization time=$BT_1-(SD_1+(SD_2-(BT_2-BT_1)))/2$, wherein $BT_1$ is said first timestamp, wherein $BT_2$ is said second timestamp, wherein $SD_1$ is said first distance, and wherein $SD_2$ is said second distance.

13. The method of claim 1, said calculating said third synchronization time comprising calculating said third synchronization time according to:
third synchronization time=$BT_2-(SD_2+(BT_2-BT_1)+SD_1)/2$ or
third synchronization time=$BT_1-(SD_1-((SD_1+(SD_2-(BT_2-BT_1)))/2$,
wherein $BT_1$ is said first timestamp, wherein $BT_2$ is said second timestamp, wherein $SD_1$ is said first distance, and wherein $SD_2$ is said second distance.

14. The computer program product of claim 4, said calculating said third synchronization time comprising calculating said third synchronization time according to:
third synchronization time=$BT_2-(SD_2+(BT_2-BT_1)+SD_1)/2$ or
third synchronization time=$BT_1-(SD_1+(SD_2-(BT_2-BT_1)))/2$,
wherein $BT_1$ is said first timestamp, wherein $BT_2$ is said second timestamp, wherein $SD_1$ is said first distance, and wherein $SD_2$ is said second distance.

15. The computing system of claim 7, said calculating said third synchronization time comprising calculating said third synchronization time according to:
third synchronization time=$BT_2-(SD_2+(BT_2-BT_1)+SD_1)/2$ or
third synchronization time=$BT_1-(SD_1+(SD_2-(BT_2-BT_1)))/2$,
wherein $BT_1$ is said first timestamp, wherein $BT_2$ is said second timestamp, wherein $SD_1$ is said first distance, and wherein $SD_2$ is said second distance.

16. The process for supporting computer infrastructure of claim 10, said calculating said third synchronization time comprising calculating said third synchronization time according to:
third synchronization time=$BT_2-(SD_2+(BT_2-BT_1)+SD_1)/2$ or
third synchronization time=$BT_1-(SD_1-(SD_2-(BT_2-BT_1)))/2$,
wherein $BT_1$ is said first timestamp, wherein $BT_2$ is said second timestamp, wherein $SD_1$ is said first distance, and wherein $SD_2$ is said second distance.

17. The method of claim 1, said first communicating entity and said second communicating entity being different communicating entities.

18. The computer program product of claim 4, said first communicating entity and said second communicating entity being different communicating entities.

19. The computing system of claim 7, said first communicating entity and said second communicating entity being different communicating entities.

20. The process for supporting computer infrastructure of claim 10, said first communicating entity and said second communicating entity being different communicating entities.

* * * * *